(12) United States Patent
Mäki-Ontto et al.

(10) Patent No.: US 8,760,024 B2
(45) Date of Patent: Jun. 24, 2014

(54) ARRANGEMENT FOR ATTACHING A MAGNET TO A ROTOR, AND A ROTOR

(75) Inventors: Petri Mäki-Ontto, Espoo (FI); Yrjö Tyllinen, Tervakoski (FI); Pekka Kanninen, Espoo (FI)

(73) Assignee: ABB Technology AG, Zurich (CH)

( * ) Notice: Subject to any disclaimer, the term of this patent is extended or adjusted under 35 U.S.C. 154(b) by 143 days.

(21) Appl. No.: 13/319,288

(22) PCT Filed: May 5, 2010

(86) PCT No.: PCT/FI2010/050364
§ 371 (c)(1),
(2), (4) Date: Dec. 1, 2011

(87) PCT Pub. No.: WO2010/128210
PCT Pub. Date: Nov. 11, 2010

(65) Prior Publication Data
US 2012/0098377 A1 Apr. 26, 2012

(30) Foreign Application Priority Data
May 7, 2009 (FI) ..................... 20095515

(51) Int. Cl.
*H02K 1/28* (2006.01)
*H02K 1/27* (2006.01)

(52) U.S. Cl.
USPC .............. 310/156.15; 310/156.28; 310/261.1

(58) Field of Classification Search
CPC ............ H02K 1/278; H02K 1/27; H02K 1/28
USPC ............... 310/156.15–156.31, 156.72, 261.1, 310/156.48–156.52, 156.61, 310/156.63–156.65, 156.67
IPC ............................................. H02K 1/27, 1/28
See application file for complete search history.

(56) References Cited

U.S. PATENT DOCUMENTS

| | | | |
|---|---|---|---|
| 2,877,366 A | 3/1959 | Carr | |
| 3,567,974 A * | 3/1971 | Spingler | 310/46 |
| 4,393,320 A * | 7/1983 | Anderson | 310/156.77 |
| 4,506,181 A | 3/1985 | Jones et al. | |
| 5,894,183 A * | 4/1999 | Borchert | 310/216.013 |
| 7,030,530 B2 * | 4/2006 | Malmberg | 310/156.28 |

FOREIGN PATENT DOCUMENTS

| | | | |
|---|---|---|---|
| DE | 20 13 0638 A1 | 9/1971 | |
| JP | 2003-143786 A | 5/2003 | |
| JP | 2005-328664 A | 11/2005 | |
| JP | 2005341707 A * | 12/2005 | ............... H02K 1/27 |

OTHER PUBLICATIONS

Machine Translation, JP 2005341707 A, Dec. 8, 2005.*
Machine Translation, JP 2003143786 A, May 16, 2003.*
Oxford English Dictionary, definition of the term "articulate", Jul. 21, 2013.*
Oxford English Dictionary, definition of the term "joint", Jul. 21, 2013.*
International Search Report (PCT/ISA/210) issued on Sep. 6, 2011, by European Patent Office as the International Searching Authority for International Application No. PCT/FI2010/050364.

* cited by examiner

Primary Examiner — John K Kim
Assistant Examiner — Thomas Truong
(74) Attorney, Agent, or Firm — Buchanan Ingersoll Rooney PC (57) ABSTRACT

In an arrangement in accordance with the invention for attaching a permanent magnet to an electrical machine's rotor, the rotor comprises at least two magnetic poles, and there is a pole gap between two magnetic poles. Permanent magnets are installable on the surface of the magnetic core. A pole piece is installable on the permanent magnet side facing the air gap. There is fixing means on the sides of the pole piece facing the pole gap for attaching the pole piece to the rotor using the locking parts, and the fixing means are connected to the pole piece through an articulated joint.

19 Claims, 6 Drawing Sheets

ARRANGEMENT FOR ATTACHING A MAGNET TO A ROTOR, AND A ROTOR

SCOPE OF THE INVENTION

The object of the invention is an arrangement for attaching a permanent magnet to a rotor according to the Preamble in Claim 1, and a rotor according to the preamble part of Claim 13.

PRIOR ART

In a permanent-magnet synchronous machine, a magnetic field is generated using permanent magnets installed in the machine's rotor. The permanent magnets are either fitted on the surface of the rotor facing the air gap, or the permanent magnets are embedded into the rotor's magnetic core. The magnetic core is most often made of ferromagnetic iron sheets assembled into a sheet core extending throughout the rotor's length. The design criterion for dimensioning the permanent magnets and sheet core is the excitation power required by the electrical machine. The mechanical structure and the fastening of different components are affected by factors such as the forces imposed on them and the size of the electrical machine.

A permanent magnet is a component manufactured from a magnetically hard material and is able to retain its magnetism permanently after magnetization. Permanent magnets are manufactured, for example, from an AlNiCo mixture that includes aluminum, nickel, cobalt and steel, or from ceramic materials or rare earth metals.

As permanent magnets are embedded into the magnetic core of a rotor assembled from uniform sheets in a characteristic manner, thin necks will be generated on both sides of the permanent magnet, supporting the pole piece. As the rotor rotates at a non-standard speed or varying speed, the thin necks bear the load caused by centrifugal forces generated by the pole and magnets, and an alternating load is directed at the thin necks. The alternating load causes fatigue, and the allowed fatigue stresses are significantly lower than the allowed static stresses. In addition, some of the flux generated by the magnets is lost because of the stray flux short-circuited by the thin necks.

Centrifugal forces also tend to cause transitions in the pole. In order to prevent any transitions, the necks must be able to maintain tight compression.

A characterized method of attaching permanent magnets to the rotor surface facing the air gap is to glue the permanent magnets to the rotor surface and install a supporting binding manufactured of carbon fiber around the rotor. A disadvantage of the embodiment is a reduction in the mechanical air gap between the stator and rotor, which may cause problems in installation or damage the binding band during installation or when the rotor rotates.

DESCRIPTION OF INVENTION

The purpose of the present invention is to create an arrangement for attaching a magnet to a rotor, and to create a rotor where the stray flux is as little as possible, reducing wear in the magnetic material, and where the capacity of bearing the load caused by the centrifugal forces of the pole and magnets is at a good level without increasing the air gap between the stator and rotor.

In order to achieve this, the invention is characterized by the features specified in the characteristics sections of Claims 1 and 13. Some other preferred embodiments of the invention have the characteristics specified in the dependent claims.

In an arrangement in accordance with the invention for attaching a permanent magnet to an electrical machine's rotor, the rotor comprises at least two magnetic poles. There is a pole gap between two magnetic poles. Permanent magnets are installable on the surface of the magnetic core, and a pole piece is installable on the permanent magnet side facing the air gap. The pole piece sides facing the pole gap comprises fixing means for attaching the pole piece to the rotor using the locking parts. The fixing means are connected to the pole piece through an articulated joint.

In an electrical machine in accordance with the invention, the rotor comprises at least two magnetic poles. There is a pole gap between two magnetic poles. Permanent magnets are installed on the surface of the magnetic core, and a pole piece is installed on the permanent magnet side facing the air gap. The pole piece sides facing the pole gap comprise fixing means for attaching the pole piece to the rotor using the locking parts. The fixing means are connected to the pole piece through an articulated joint.

For attaching the permanent magnet, the invention uses a detachable pole piece which is attached to the rotor using separate fixing means and locking parts. This way, the load caused by centrifugal forces is divided evenly between the pole piece and fixing means. Because the centrifugal load caused by the pole and permanent magnets is borne by separate parts, their material and shape can be kept separate from the electrical dimensioning of the electrical machine. This embodiment produces a good capacity for bearing the load caused by the centrifugal forces generated by the pole and permanent magnets.

The pole piece sides facing the pole gap comprise fixing means that is connected to the pole piece through an articulated joint. Because of the articulated joint, the attachment to the pole piece can be carried out so that it does not cause any bending moment in the pole piece and fixing means during loading and pre-tensioning. The bending moment causes bending stress in the structure, e.g., in bolt connections or uniform electric sheet necks, thus weakening the structure.

The articulated joint can be formed between the fixing means and pole piece using a pin passing through the fixing means and pole piece.

The articulated joint can also be formed between the locking parts of the fixing means. In this case, the fixing means are supported at both ends through an articulated joint, and only bears tension. The full cross-sectional area of the fixing means can be utilized when the fixing means bear only unidirectional stress, tensile or compression stress. In addition, it is easier to dimension the parts because they only need to bear tensile stress. This also increases the reliability of the structure.

In the embodiment in accordance with the invention, the parts that bear centrifugal forces can be pre-tensioned when attaching the permanent magnet, in which case the transitions caused by the centrifugal forces in the pole can be minimized. The removal of transformations ensures that there is no fluctuation in stress in the structure, thus avoiding structural fatigue. The tight compression of the pole face against the permanent magnet produced using fixing and locking parts evens out as the rotor rotates as centrifugal forces tend to push the permanent magnet towards the air gap in a radial direction.

The embodiment in accordance with the invention does not reduce the air gap between the rotor and stator because the fixing and locking parts are not extended outside the outer pole face surface facing the air gap.

According to an embodiment of the invention, slots are generated on the sides of the pole piece where the fixing means can be fitted.

According to a further embodiment of the invention, the pole piece is made of sheets of different shapes that are joined together so that unidirectional slots are formed on the sides of the pole piece.

The pole piece can also be built of solid iron. Slots or holes for fixing means can be generated in a solid iron pole piece by milling.

According to yet another embodiment of the invention, the pole piece's radial compressive force towards the permanent magnet can be adjusted using locking parts.

According to an embodiment of the invention, the pole piece's fixing means are made of a non-magnetic material. In this case, the stray flux is significantly smaller because the pole piece and rotor back are not in contact through a magnetic material.

According to another embodiment of the invention, the pole piece can be utilized in pre-tensioning by shaping the pole piece surface facing the magnet so that it is in contact in the middle and not in contact on the sides. In this case, the lower surface of the pole piece which is in contact with the top surface of the permanent magnet is shaped so that the there are gaps on the sides between the lower surface and the top surface of the permanent magnet before attaching the pole piece using fixing means. Axial gaps are on the sides of the lower surface of the pole piece in the transverse direction so that the parts of the lower surface facing the pole piece's pole gaps are not in contact with the top surface of the permanent magnet.

During pre-tensioning, the pole piece bends, losing the gaps between the magnets and the pole piece, in which case bending stress is generated in the pole piece, improving the structure's fatigue resistance. By shaping the pole piece, surface pressure on the magnet surface can also be evened out, which improves the durability of the magnet under pressure.

According to yet another further embodiment of the invention, the fixing means is an elongated strip with a hole at least at one end. The strip can be manufactured by punching, which is a precise and inexpensive manufacturing method in serial production. Using sheet-like material is also less expensive than screws or shaped fixing parts.

The pole piece is attached to the rotor using locking parts. These comprise for instance the locking element fixed to the rotor and the tensioner with which the fixing parts are tightened onto the locking element. The locking part is attached to the pole gap between two magnetic poles, for example.

If the rotor is assembled from sheets, there are intermediate sheets at the ends of the sheet pack where the locking part can be attached. In this case, the intermediate sheet bears the centrifugal force caused by the poles and permanent magnets when the rotor rotates. By attaching the locking parts to the intermediate sheet, tensioning ratios and distances can also be changed.

FIGURES

In the following, the invention will be described in more detail with the help of certain embodiments by referring to the enclosed drawings, where.

DETAILED DESCRIPTION

The electrical machine rotor illustrated in the figures is a rotor for a permanent-magnet motor or a permanent-magnet generator.

Figure 1:
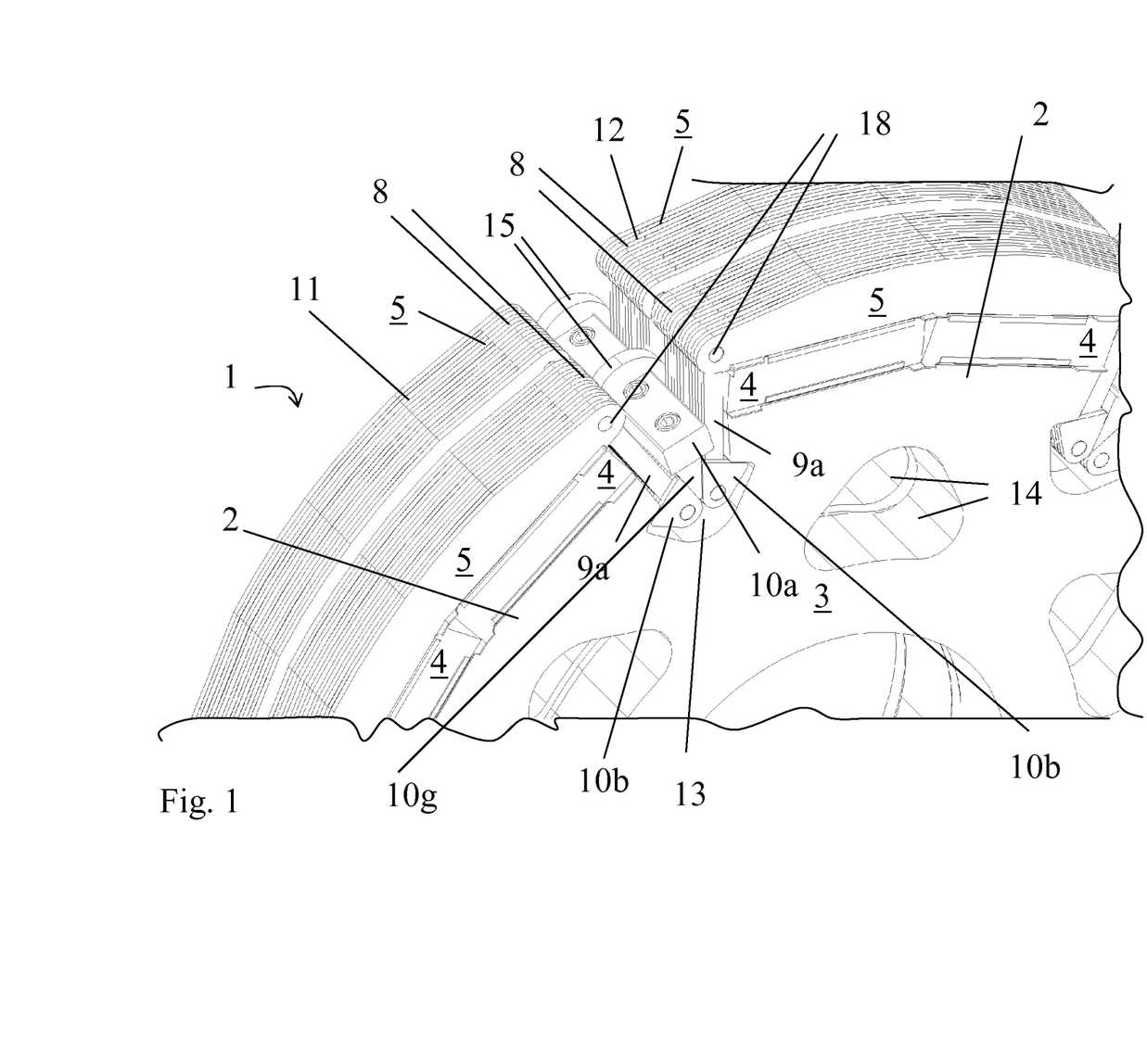
FIG. 1 is a partial illustration of an electrical machine's rotor with permanent magnets attached.
Figure 2:
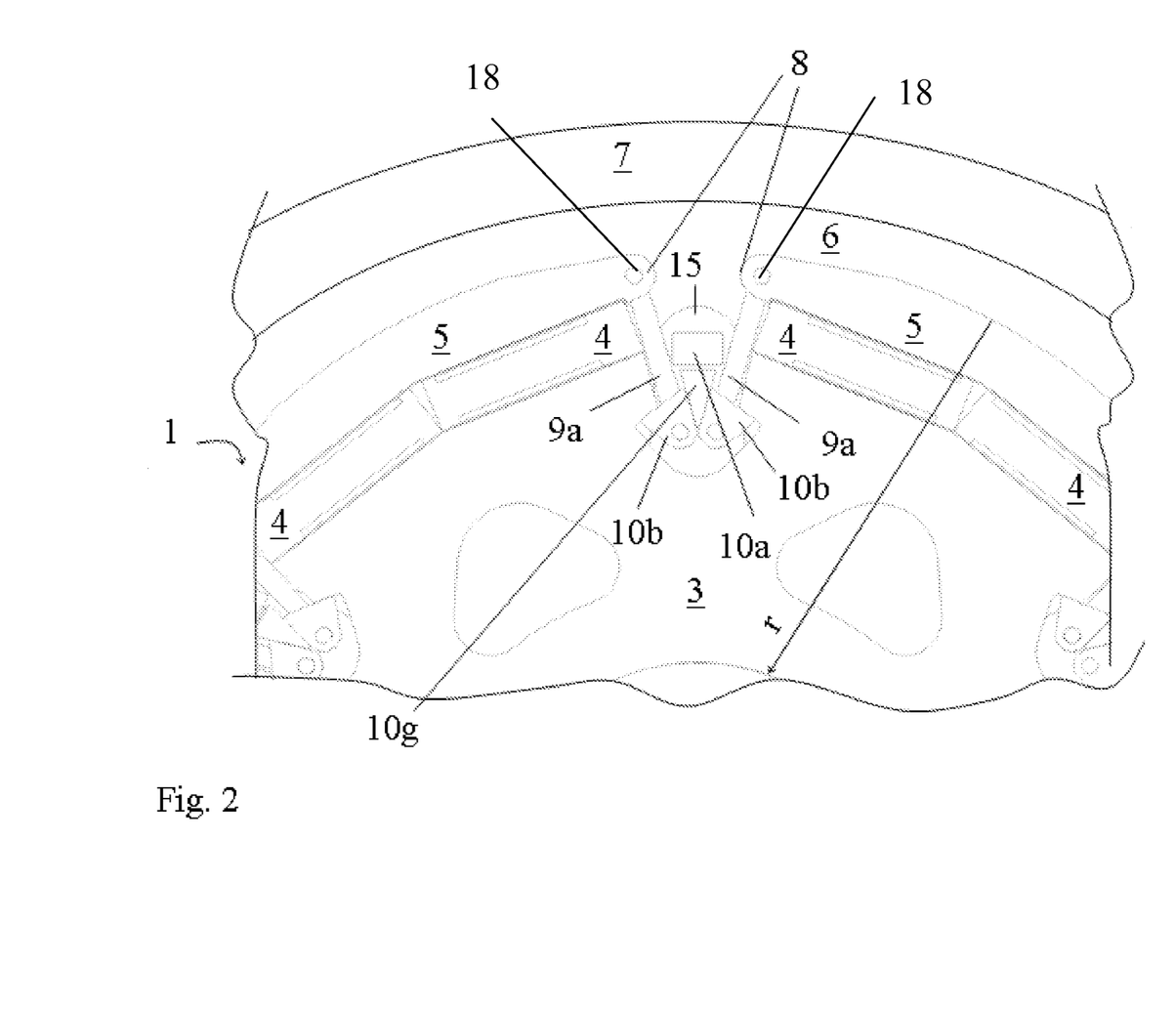
FIG. 2 is a partial illustration of the rotor presented in FIG. 1 viewed from the rotor end.

FIG. 1 is a partial illustration of an electrical machine's rotor 1. FIG. 2 is a partial illustration of the rotor 1 presented in FIG. 1 viewed from the end of the rotor 1. FIGS. 1 and 2 present a rotor manufactured of electric sheets. The rotor can also be a solid rotor.

The rotor 1 is one air gap 6 away from the stator 7. The rotor 1 comprises several magnetic poles 2. There is a pole gap 13 between two magnetic poles. Permanent magnets 4 are installed by magnetic poles 2 on the surface of the magnetic core 3. A separate pole piece 5 is installed on the permanent magnet 4 side facing the air gap 6. The pole piece's 5 sides 8 facing the pole gap 13 comprise fixing means 9a for attaching the pole piece 5 to the rotor using locking parts 10a-b, g.

In FIGS. 1 and 2, each pole piece 5 is attached to two permanent magnets 4. In a rotor 1 with permanent magnets, it is useful to have much magnetic surface on the magnetic pole 2.

The pole piece 5 is assembled of sheets 11 of different shapes. The sheets of different shapes 11 are joined together so that unidirectional slots 12 are formed on the sides 8 of the pole piece 5 facing the pole gap 13. The sides 8 of the pole piece 5 are supported using support loops 9a installed in the slots 12.

The fixing means, support loops 9a are attached to the pole piece 5 through an articulated pivot connection 18. The support loops 9a and pole piece sheets 11 have holes 19 for the pin 18. Pin 18 is pushed through the fixing means, support loops 9a and pole piece sheets 11. The pin 18 forms a joint between the fixing means, support loops 9a and pole piece 5. When tightening the pole piece 5, the pin 18 can only generate force in the direction of the support loops 9a.

The support loops 9a of two adjacent pole pieces 5 are tightened using the locking parts 10a-b, g in a shared pole gap 13: the tightening bar 10a, wedge 10g and locking element 10b. The wedge 10g is pushed downwards using screws, for instance, located in the tightening bar 10a, in which case the locking elements 10b are wedged against the forms in the pole gap 13. The support loops 9a are attached to the pole gap 13 using the form-closed locking element 10b. Holes are formed at the bottom of the pole gap 13 where the shoulder of the locking element 10b fits.

The rotor 1 is assembled of sheet packs 14 with intermediate sheets 15 at the ends. The intermediate sheet is attached to the shaft of the rotor 1, and its main purpose is to bear forces. The intermediate sheet 15 also transmits the moment to the shaft and keeps the sheet packs 14 separate from one another. In FIGS. 1 and 2, the length of the locking element 10b is that of a single sheet pack 14.

The pole piece 5 can be pressed tightly against the permanent magnets 4 using the support loops 9a, tightening bars 10a and its screws, wedges 10g and locking elements 10b. The radial r compressive force of the pole piece 5 towards the permanent magnets 4 can be adjusted using the locking parts 10a-b, g, generating the desired pre-tensioning in the permanent magnets 4. The pre-tensioning evens out once the rotor 1 starts to rotate because centrifugal forces tend to push the permanent magnets towards the air gap 6, against the radial r compressive force.

The fixing means, support loops 9a and locking parts, i.e. the tightening bar 10a, wedge 10g and locking element 10b, are installed in the pole gap 13. In this case, the air gap between the rotor 1 and stator 7 is free from the fixing means and locking parts.

Using the pin 18 and fixing means, the pole piece 5 can be tightened from its sides so that the joint is articulated. An articulated joint is useful in that it does not cause any bending moment in the pole piece and fixing means.

In the structure illustrated in FIG. 1, the majority of the load caused by centrifugal forces is directed at the magnetic core 3.

Figure 3:
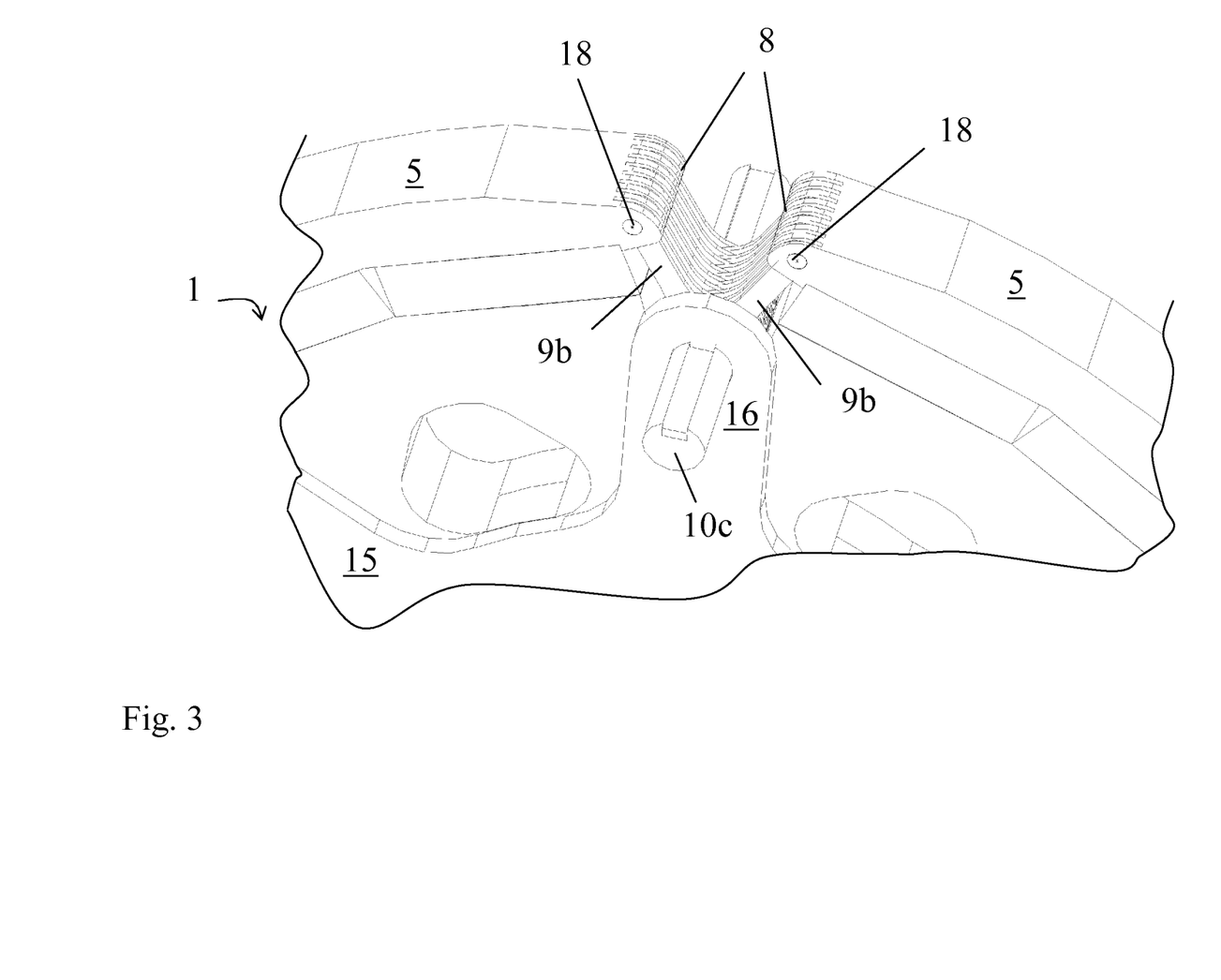
FIG. 3 is a partial illustration of another electrical machine's rotor with permanent magnets attached.
Figure 4:
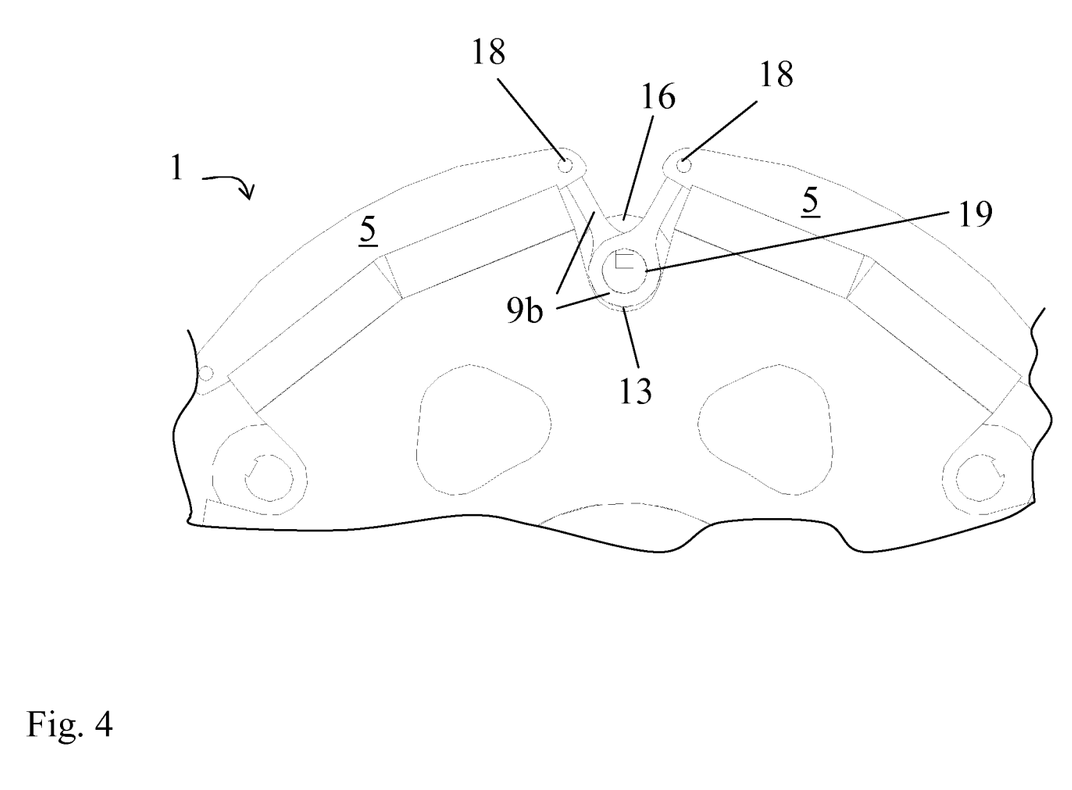
FIG. 4 is a partial illustration of the rotor presented in FIG. 3 viewed from the rotor end.

FIGS. 3 and 4 are partial illustrations of another electrical machine's rotor 1. In the rotor 1 illustrated in FIGS. 3 and 4, the fixing means 9b in both pole pieces 5 facing the pole gap 13 between two adjacent pole pieces 5 is locked using the shared locking part 10c in the pole gap 13.

The sides 8 of the pole piece 5 are supported using support loops 9b installed in the slots. Both ends of the support loop 9b comprise a hole for the pivot connection.

The support loops 9b are attached to the pole piece 5 through a pivot connection 18. The pin 18 forms a joint between the support loops 9b and pole piece 5.

The support loops 9b are attached to the locking part, i.e. pin 10c, at the end facing the magnetic core 3. The pin 10c forms a joint between the support loops 9b and locking part 16. The support loop 9b, i.e. fixing means, supported at both ends through an articulated joint only bears tension, in which case only tensile stress is directed at the support loop. The fixing means, i.e. support loop 9b, only bears tensile stress, in which case the full cross-sectional area of the fixing part is utilized.

The rotor 1 is assembled of sheet packs 14 with intermediate sheets 15 at the ends. Only one intermediate sheet 15 is illustrated in FIGS. 3 and 4. Radial brackets 16 are generated in the intermediate sheet 16 by the pole gaps 13. The brackets 16 extend above the locking parts 10c located in the pole gap 13 in a radial direction. The grooved pin 10c located at the bottom of the pole gap 13 that locks the pole piece 5 is attached to the bracket 16 of the intermediate sheet 15.

Figure 5:
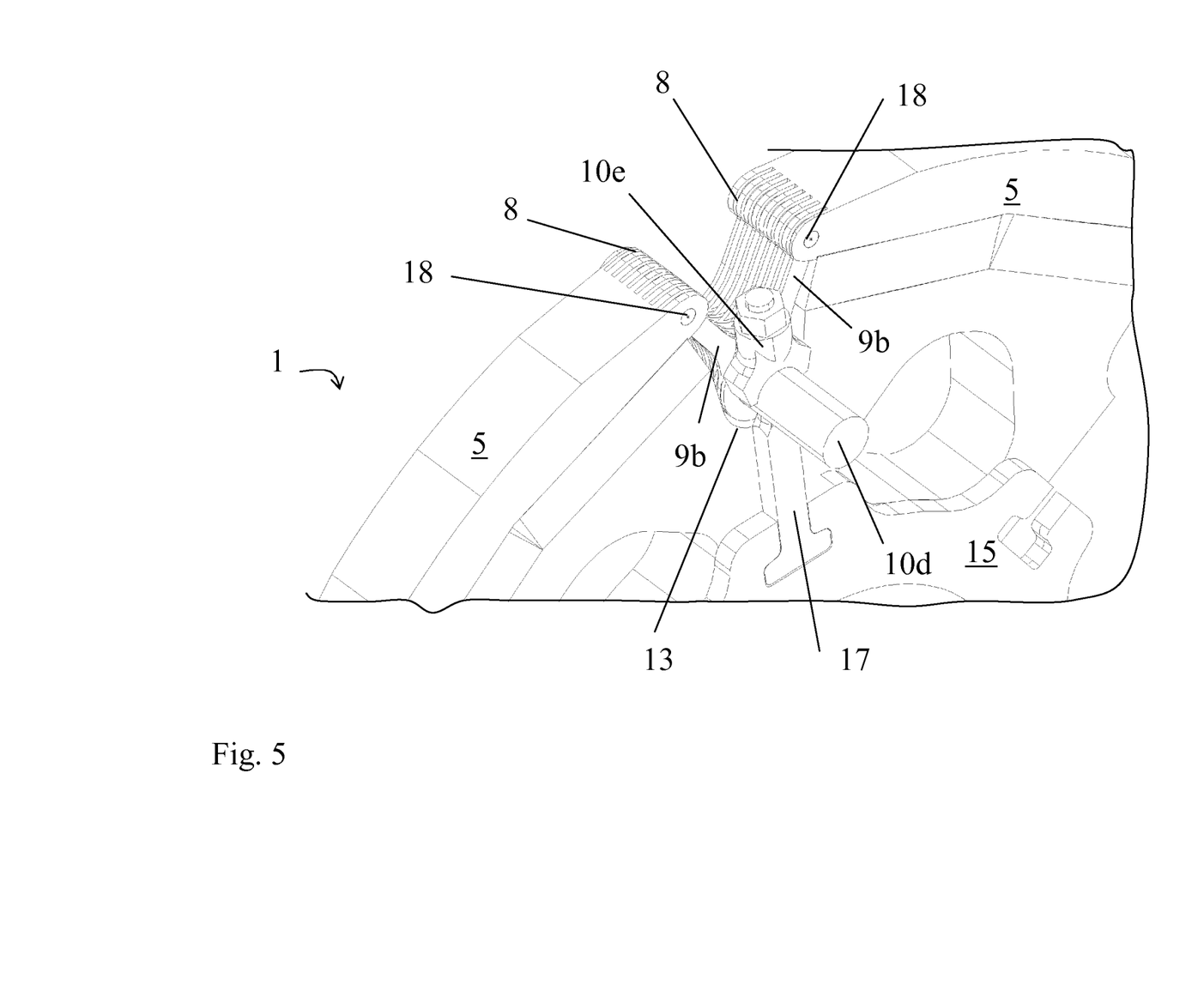
FIG. 5 is a partial illustration of yet another electrical machine's rotor.

In the rotor 1 illustrated in FIG. 5, the fixing means 9b in both pole pieces 5 facing the pole gap 13 between two adjacent pole pieces 5 is locked using the shared locking part 10d-e. The fixing means 9b of the adjacent pole pieces 5 is interlocked in the locking part 10d. The locking parts 10e-d are attached to the intermediate sheet 15 using support elements 17.

The sides 8 of the pole piece 5 are supported using support loops 9b installed in the slots. The support loops 9b are attached to the pole piece 5 and locking part 10d through a pivot connection. The pins 18, 10d act as joints at both ends of the support loops 9b.

The pin 10d located at the bottom of the pole gap 13 that locks the pole piece 5 is tightened to the support arm 17 using a screw 10e. The support arm 17 is attached to the intermediate sheet 15 through a form closure joint.

Figure 6:
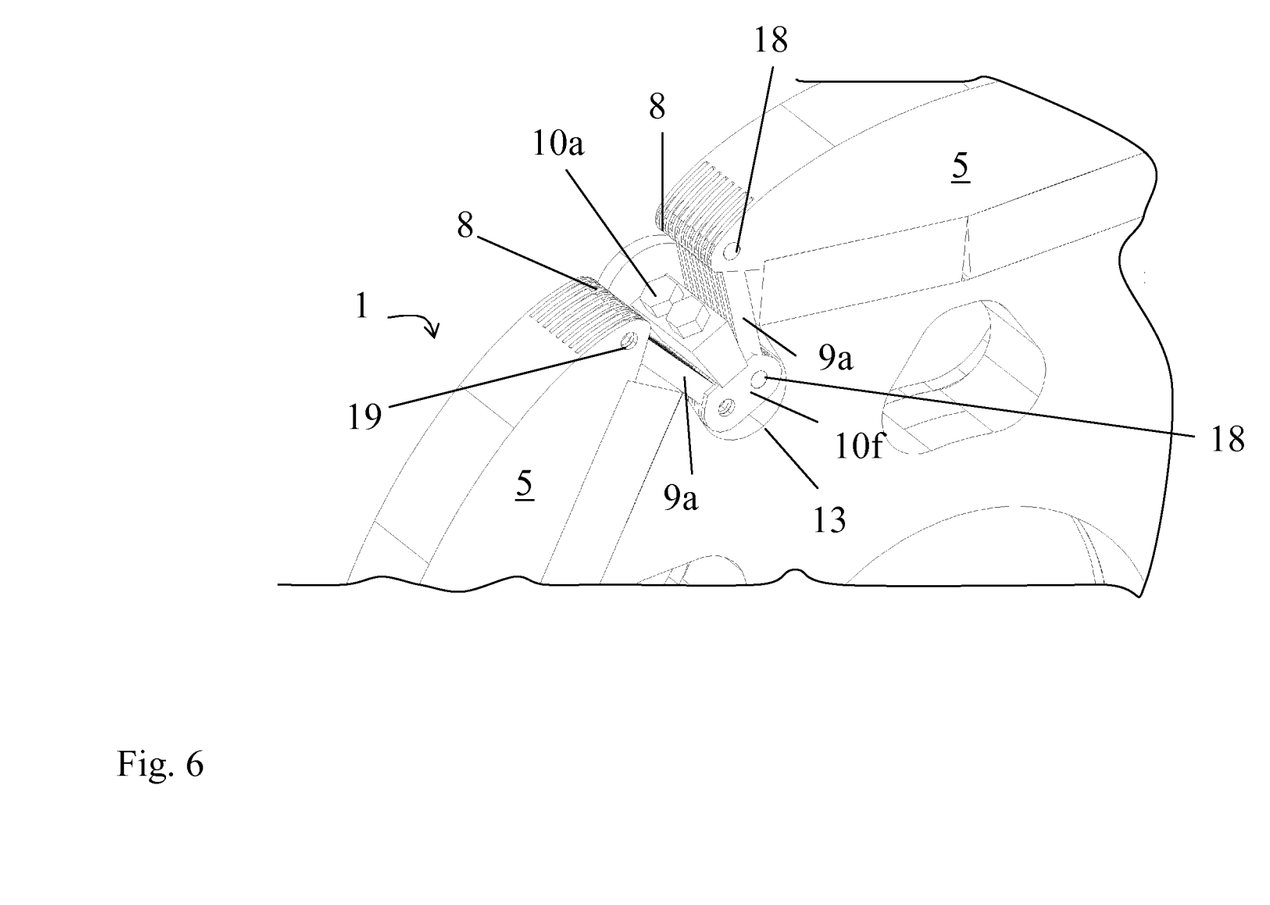
FIG. 6 is a partial illustration of yet another further electrical machine's rotor.

In the rotor 1 illustrated in FIG. 6, the fixing means 9a in both pole pieces 5 facing the pole gap 13 between two side-by-side pole pieces 6 is locked using the shared locking part 10a, f. The fixing means 9a of the adjacent pole pieces 5 is set against each other in the transverse direction in the locking part 10f.

The sides 8 of the pole piece 5 are supported using support loops 9a installed in the slots. The support loops 9a are attached to the pole piece 5 using the pin 18 which acts as a joint.

The support loops 9a are attached to the pin sheet 10f at the end facing the magnetic core 3 using pins 18. Two holes are generated in the pin sheet 10f, each for the pin 18 of the fixing means 9a in the side 8 of the pole piece 5.

The support loops 9a are tightened using the tightening bar 10a with screws located in the pole gap 13 and the pin sheet 10f which acts as the locking element.

In FIGS. 3-6, the loads caused by centrifugal forces are directed at the intermediate sheet 15.

The pole piece 5 can also be made of solid iron. Slots or holes 12 for fixing means 9a-b can be generated in a solid iron pole piece by milling.

The fixing means 9a-b of the pole piece 5 are preferably non-magnetic. In this case, the stray flux is significantly smaller because the pole face and rotor back are not in contact through a magnetic material.

In the figures, the fixing means 9a-b is an elongated strip with a hole 19 at both ends for the pin 10c, 18.

In the figures, support loops 9a-b are also used as fixing means. In addition, wire or chain can also be used as fixing means.

Parts list: 1 rotor; 2 magnetic pole; 3 magnetic core; 4 permanent magnet; 5 pole piece; 6 air gap; 7 stator; 8 side; 9a, b support loop; 10a tightening bar, 10b locking element, 10c, d pin, 10e screw, 10f pin sheet, 10g wedge; 11 sheet; 12 slot; 13 pole gap; 14 sheet pack; 15 intermediate sheet; 16 bracket; 17 support arm; 18 pin; 19 hole; r radial direction.

The invention claimed is:

1. An arrangement for attaching a permanent magnet to a rotor of an electrical machine comprising:
    a rotor having at least two magnetic poles, and between the two magnetic poles is a pole gap;
    a permanent magnet installable on a surface of a magnetic core;
    a pole piece installable on a side of the permanent magnet facing an air gap; and
    an elongated strip on each side of the pole piece facing the pole gap for attaching the pole piece to the rotor using locking parts, and the elongated strip being connected to the pole piece through an articulated pivot connection, wherein said articulated pivot connection has a in that passes through the elongated strip and the pole piece.

2. An arrangement according to claim 1, comprising a slot on side of the pole piece, the elongated strip being fittable in the slot.

3. An arrangement according to claim 1, wherein the pole piece is assembled of sheets of different shapes.

4. An arrangement according to claim 3, wherein the sheets are joined together so that parallel slots are formed on the sides of the pole piece.

5. An arrangement according to claim 1, wherein the pole piece is made of solid iron.

6. An arrangement according to claim 1, wherein a radial compressive force of the pole piece towards the permanent magnet is adjustable using the locking parts.

7. An arrangement according to claim 1, wherein the elongated strip is made of non-magnetic material.

8. An arrangement according to claim 1, wherein the locking part is attached to the pole gap.

9. An arrangement according to claim 1, wherein the locking part is attached to an intermediate sheet attached to an end of a sheet pack sheets of the rotor.

10. An arrangement according to claim 1, wherein the elongated strip is connected to the locking parts through another articulated pivot connection.

11. An arrangement according to claim 1, wherein the elongated strip includes a hole for the pin at least at one end.

12. A rotor of an electrical machine where the rotor comprises:
- at least two magnetic poles, and a pole gap between the two magnetic poles;
- permanent magnets on a surface of a magnetic core;
- a pole piece installed on a side the permanent magnet facing an air gap; and
- an elongated strip on each side of the pole piece facing the pole gap for attaching the pole piece to the rotor with locking parts, the elongated strip being connected to the pole piece through an articulated pivot connection, wherein said articulated pivot connection has a in that passes through the elongated strip and the pole piece.

13. A rotor according to claim 12, comprising slots on sides of the pole piece where the elongated strip are fittable in the slots.

14. A rotor according to claim 13, wherein the pole piece is assembled of sheets of different shapes.

15. A rotor according to claim 13, wherein the locking parts are configured for adjusting a radial compressive force of the pole piece towards the permanent magnet.

16. A rotor according to claim 12, wherein the pole piece is assembled of sheets of different shapes.

17. A rotor according to claim 16, wherein the sheets are joined together so that parallel slots are formed on the sides of the pole piece.

18. A rotor according to claim 12, wherein the locking parts are configured for adjusting a radial compressive force of the pole piece towards the permanent magnet.

19. A rotor according to claim 12, wherein the locking parts are attached to the pole gap.

* * * * *

UNITED STATES PATENT AND TRADEMARK OFFICE
CERTIFICATE OF CORRECTION

PATENT NO.        : 8,760,024 B2
APPLICATION NO.   : 13/319288
DATED             : June 24, 2014
INVENTOR(S)       : Petri Maki-Ontto et al.

Page 1 of 1

It is certified that error appears in the above-identified patent and that said Letters Patent is hereby corrected as shown below:

In the Claims:

Column 6, Claim 1, Line 46-47: replace "wherein said articulated pivot connection has a in that passes through the elongated strip and the pole piece." with -- wherein said articulated pivot connection has a pin that passes through the elongated strip and the pole piece. --

Column 7, Claim 12, Line 17-18: replace "wherein said articulated pivot connection has a in that passes through the elongated strip and the pole piece." with -- wherein said articulated pivot connection has a pin that passes through the elongated strip and the pole piece. --

Signed and Sealed this
Sixteenth Day of September, 2014

Michelle K. Lee
*Deputy Director of the United States Patent and Trademark Office*